(12) United States Patent
Perret et al.

(10) Patent No.: US 6,672,343 B1
(45) Date of Patent: Jan. 6, 2004

(54) DEVICE FOR SUPPLYING POWDER FOR A DEVICE FOR PRODUCING A THREE-DIMENSIONAL OBJECT LAYER BY LAYER

(75) Inventors: Hans Perret, München (DE); Berhard-Franz Graf, Schondorf (DE); Ulli Christian Sagmeister, Postmünster (DE)

(73) Assignee: EOS GmbH Optical Systems, Planegg (DE)

( * ) Notice: Subject to any disclaimer, the term of this patent is extended or adjusted under 35 U.S.C. 154(b) by 74 days.

(21) Appl. No.: 10/019,748
(22) PCT Filed: Jun. 16, 2000
(86) PCT No.: PCT/EP00/05558
§ 371 (c)(1), (2), (4) Date: Dec. 21, 2001
(87) PCT Pub. No.: WO00/78485
PCT Pub. Date: Dec. 28, 2000

(30) Foreign Application Priority Data

Jun. 21, 1999 (DE) .......................................... 199 28 245

(51) Int. Cl.$^7$ ............................................... B65B 1/04
(52) U.S. Cl. ............................. 141/95; 141/12; 141/80; 141/125; 141/280
(58) Field of Search ............................. 141/12, 73, 80, 141/95, 125, 250, 280; 264/125, 308; 156/273.3, 273.5, 275.5, 379.8

(56) References Cited

U.S. PATENT DOCUMENTS 5,387,380 A   2/1995   Cima et al. .................... 264/69
5,637,175 A   6/1997   Feygin et al. ................. 156/264
5,647,931 A   7/1997   Retallick et al. ........... 156/73.6
5,934,343 A * 8/1999   Gaylo et al. .................... 141/12
6,046,426 A   4/2000   Jeantette et al. ........ 219/121.63

FOREIGN PATENT DOCUMENTS

JP   3010312   3/1996

\* cited by examiner

*Primary Examiner*—Gene Mancene
*Assistant Examiner*—Peter deVore
(74) *Attorney, Agent, or Firm*—George W. Neuner; Edwards & Angell, LLP

(57) ABSTRACT

An apparatus for delivering powder onto a plane surface (1) of a device for creating a three-dimensional part in a layer-by-layer fashion, in particular of a laser sintering machine, is provided. It comprises a covering means (3) which can be moved back and forth in a second direction perpendicular to said first direction by means of a drive between a lateral first position and a second position located on the opposite side. In at least one of the positions it can be filled with powder. In order to simplify the apparatus and improve its operation, the covering means (3) comprises a slit (6) extending across the entire width and open at its top and its bottom as well as smoothening elements (7, 8) at the ends opposite of the surface. A store container (9) is provided above the covering means (3), the volume of said store container at each location across the entire width being at least equal to the volume of the slit cavity located underneath.

17 Claims, 2 Drawing Sheets

DEVICE FOR SUPPLYING POWDER FOR A DEVICE FOR PRODUCING A THREE-DIMENSIONAL OBJECT LAYER BY LAYER

The invention relates to an apparatus for supplying powder onto a plane surface of a device for creating a three-dimensional part in a layer-by-layer fashion according to the pre-characterizing part of claim 1.

Devices for creating a three-dimensional part in a layer-by-layer fashion are known for example from WO 95/18715, WO 98/18124 and from EP 0 882 568. Using such devices, a three-dimensional part is created by selectively solidifying successive layers of a powdery material at locations corresponding to the respective cross section of the part, for example by the action of a laser beam.

In a known device of this type, in each lateral end position, a predetermined amount of powder from a store container is entered into a covering apparatus. In order to make sure that in each layer the entire surface is reliably covered with powder, the predetermined amount has to be larger than the amount theoretically required. Due to non-uniform sintering in each of the previous layers as regarded across the width of the surface, powder consumption in individual sections of the covering apparatus is different. For that reason, prior to the subsequent filling or after a predetermined number of covering processes, the covering apparatus is emptied across its entire width before a new filling with a predetermined amount of powder across the entire width is carried out. On the one hand, this causes a relatively high powder consumption and the powder has to be recycled. On the other hand, the overall process is extended by the required emptying process.

A device where the predetermined amount of powder filled into the covering means is larger than the amount theoretically needed and where the excessive powder is emptied after each covering process, is known from WO 95/18715.

It is an object of the invention to avoid the above described drawbacks.

This object is achieved by the apparatus characterized by the features of claim 1.

Further aspects and applications of the invention will be discussed in more detail in the description of embodiments illustrated in the figures, wherein.

Figure 1:
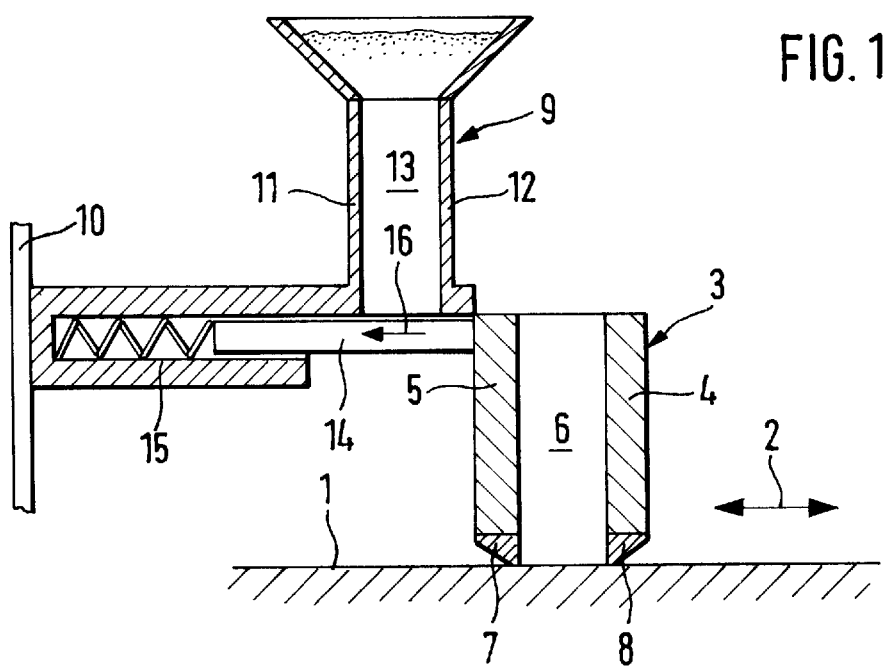
FIG. 1 is a cross-sectional side view of a first embodiment.

In FIG. 1, a surface 1 is shown which extends in a first direction perpendicular to the plane of the drawing and in a second direction, as shown by an arrow 2, perpendicular to the first direction. In each cycle of the laser sintering, this surface 1 is supplied with a powder in the known fashion, which powder is then sintered by a laser beam as a function of the geometry of the part to be formed at the locations given by the geometry of the part to be formed. Upon finishing each cycle, the surface is to be supplied again with powder prior to carrying out a subsequent sintering using a laser.

To that end, the apparatus shown in FIG. 1 comprises a covering means 3 extending in the first direction across the entire width of surface 1. It comprises two walls 3, 4 arranged at a distance from each other, extending across the entire width and forming a slit 6 therebetween which is open at the top and an the bottom. At their lower end adjacent to the surface 1, the walls 4, 5 comprise smoothening elements 7, 8. These may be formed as rubber lips or as metal blades in a conventional fashion. The covering means 3 is guided at both of its opposite ends or at one end within the frame of the apparatus such that the covering means 3 can be moved back and forth across the entire surface 1.

In the embodiment shown in FIG. 1, the covering means 3 is close to its end position. A store container 9 is provided which is supported by the machine frame 10 and which also comprises a vertically extending first wall 11 and a second wall 12 parallel and arranged at a predetermined distance thereto. The two walls 11, 12 extend in parallel to the walls 4 and 5 of the covering means and also across the entire width of surface 1, but at least across the same distance as the walls 4 and 5. The distance of the two walls from each other is preferably equal or slightly less than the distance of the two walls 4 and 5 from each other, thus forming a slit 13 which is also open at its top and its bottom and which is equal to or only slightly less than the slit 6.

The position of the two walls 11, 12 and thus of the slit 13 will be selected such that the slit is just above a slit 6 if the covering means 3 has been moved to an end position of the corresponding side.

The height of the slit is selected such that the volume per unit length of the slit is at least equal to and preferably slightly greater than the volume per unit length of the slit 6 arranged underneath.

As can be best seen in FIG. 1, the store container 9 comprises a sliding shutter 14 at its bottom and which closes the bottom of slit 13 across its entire width when in the position shown in FIG. 1. The sliding shutter 14 is mounted in a guide 15 such that it can be moved from the shown closed position into an opened position when abutted by the covering means 3, thus exposing the lower opening of slit 13 to the extent at which the covering means 3 is moved underneath the opening. If the covering means 3 is again moved away across the surface 1 from the end position below slit 13 the sliding shutter 14 sealingly closes the slit 13 due to a schematically shown spring bias.

As can be seen from FIG. 1, the store container 9 is arranged in its height precisely such that the upper edges of the walls 4, 5 will glide along the lower edges of the walls 11, 12.

A motor drive is provided in a known fashion for moving the covering means 3.

In operation, the slit 13 is initially filled with powder. The covering means 3 is then moved into the end position along its length causing the sliding shutter 14 to move in its end position and thus exposing the lower opening 13 of the slit. The powder then falls into the slit 6 underneath across the entire width and fills the slit up to its upper edge. When the covering means 3 is subsequently moved away, the lower edge of the second wall 12 results in the powder contained in slit 6 to be smoothened and powder which might otherwise extend beyond the edge of slit 6 is held back.

The covering means filled in this fashion will spread the powder in the subsequent operating cycle.

Preferably, store containers corresponding to each other and having a sliding shutter 14 and a holder are arranged on both sides opposite to each other of surface 1 such that filling is possible from both sides.

Figure 2:
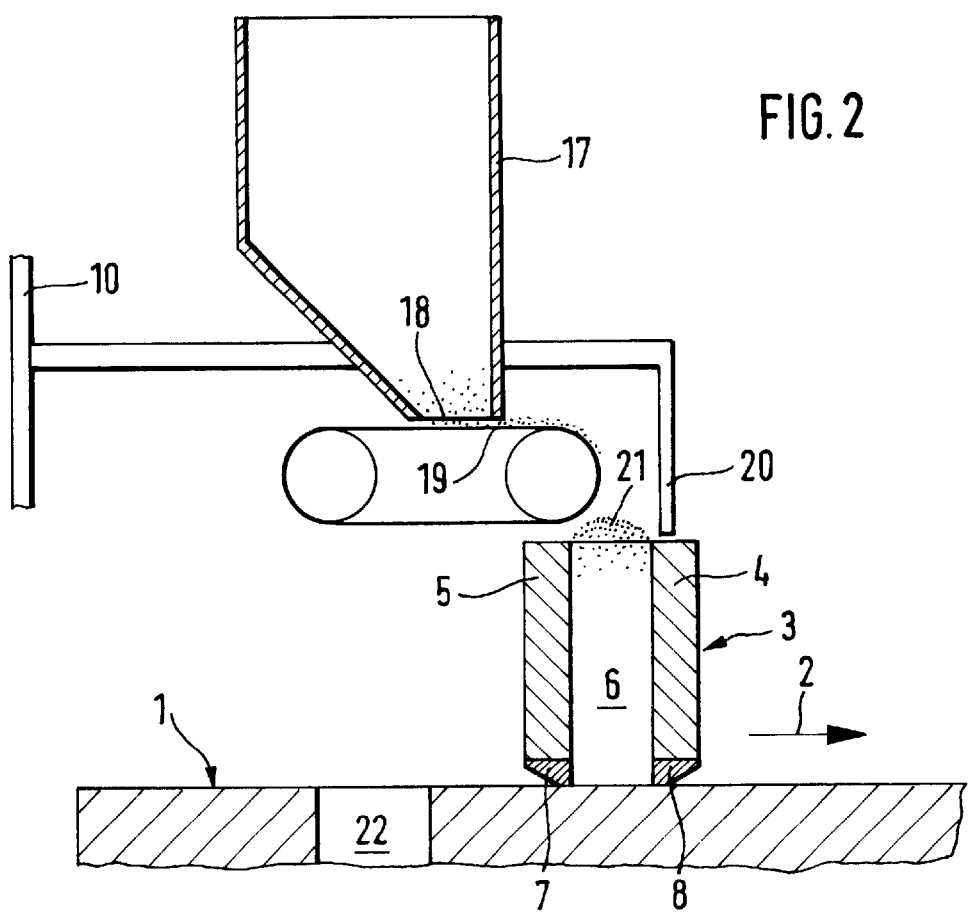
FIG. 2 is a corresponding side view of a second embodiment.

Referring to FIG. 2, a second embodiment is shown where the features coinciding with those of the first embodiment each carry the same reference numerals.

In this embodiment, just as in the first one, the covering means which can be moved across surface 1 is provided. However, the feeding device of the powder material is formed in a different manner. It comprises a store container 17 which, just as the the store container 9, extends across the entire width of the surface and at least across the entire width of slit 6 and which comprises a slit-shaped opening 18 arranged at the bottom. Just underneath the opening, a conveyor 19 extending horizontally and in parallel to the slit-shaped opening is provided and which is guided and can be motor-driven by two oppositely arranged deflecting rollers. As shown in FIG. 2, the means is arranged such that the filling position of the covering means 3 is located in a position underneath one of the ends of the conveyor 19.

The store container 17 is again secured to the machine frame 10. In addition, it comprises a scraper 20 extending across the entire width of the walls 4, 5 and arranged above the wall 4 facing the direction in which the covering means 3 is moved when it has been filled for carrying out the covering process. The scraper 20 is located directly at the upper edge of the walls 4, 5 of the covering means 3.

In operation, the conveyor 19 is started such that it conveys the powder contained in the store container 17 into the slit 6 as soon as the covering means 3 has reached the filling position shown in FIG. 2. When the indicated filling level is reached, the conveyor 19 is turned off and the covering means 3 is moved by its motor drive along the direction of arrow 2 across surface 1. In this process, powder 21 extending beyond the slit is held back by the scraper 20 and will drop to the floor behind wall 5, thus permitting a uniform filling of the slit across its entire width.

As shown in FIG. 2, a bottom-side opening 22 is provided which is connected to a receiving container (not shown) for excessive powder. During the subsequent filling process, the scraped off powder located on the floor will be shoved into the opening 22 by the smoothening elements and recovered for later use.

Figure 3:
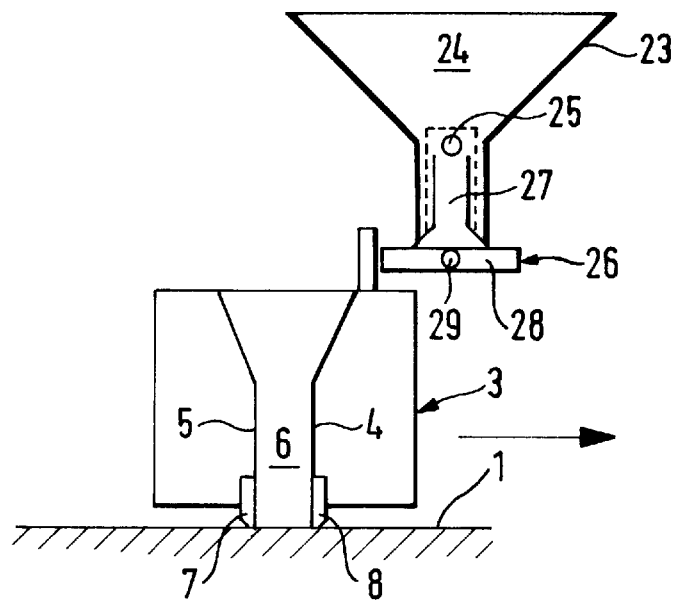
FIG. 3 is a schematic side view of a third embodiment in a first operating position.
Figure 4:
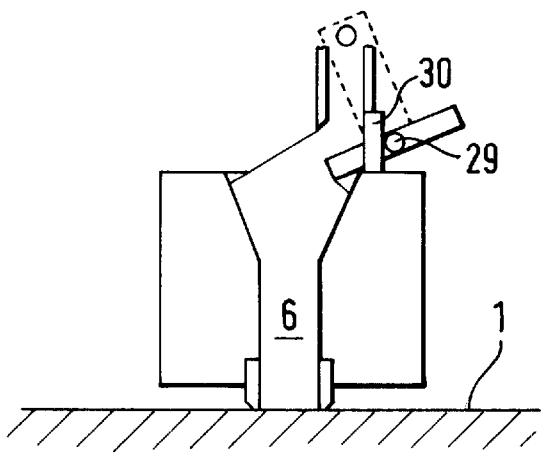
FIG. 4 shows the embodiment of FIG. 3 in a second operating position.
Figure 5:
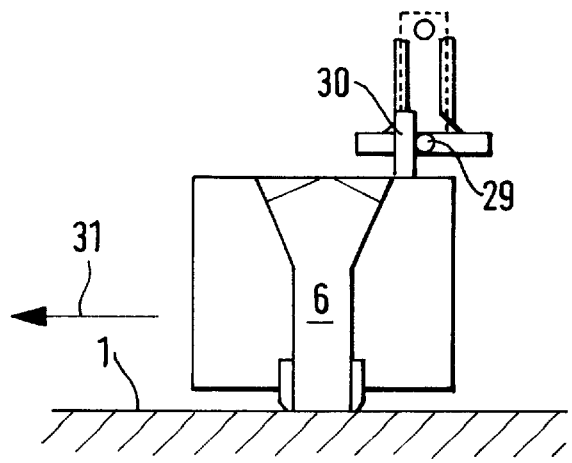
FIG. 5 shows the third embodiment in a third operating position.

Referring to FIGS. 3 to 5 showing a third embodiment, the slit 6 of the covering means 3 comprises a funnel-shaped extension at its upper end. Besides that, the covering means corresponds to the walls enclosing slit 6 and the smoothening elements 7, 8 of its lateral extension and guide across surface 1.

Again, a store container 23 extending across the entire width of the covering means is provided above the the covering means and comprises a sufficiently large storage space 24. Its bottom-side opening can be closed by a shutter 26 pivotally mounted on a frame-mounted axle or pin 25. The shutter 26 comprises a lateral guiding device 27 hinged on the axle or pin 25 and supporting a side 28 extending across the entire length and width of the bottom-side opening of the store container 23. A plate 28 comprises a protruding bolt 29 on one of its sides. The wall of the covering means 3 comprises an actuating arm 30 engaging the bolt when the filling position is reached.

As shown in FIGS. 3 to 5, the store container 23 is closed in the operating position (FIG. 3) due to the own weight of the shutter 26 or a spring bias. As soon as the covering means reaches the filling position the store container 23 is opened by engaging the bolt 29 and the actuating arm 30 such that the powder will fall into the slit 6 from the storage space 24 (FIG. 4). Once a sufficient filling level is reached, the covering means 3 moves back across surface 1 along the direction shown by arrow 31 in FIG. 5 causing the store container 23 to be closed again (FIG. 5).

Again, the desired filling level is recognized by a sensor or by letting the covering device rest in the filling position during a predetermined period.

As an alternative to the above embodiments, the store container may also be provided at a location other than above the covering means, for example outside the machine, in which case it will be linked to the covering means via a suitable conveying device.

The invention is not limited to an apparatus for supplying powder to a laser sintering machine. For example, the apparatus may also be used in a device for creating a three-dimensional part in a layer-by-layer fashion where the powder is solidified by adding a binder or an adhesive.

What is claimed is:

1. An apparatus for supplying powder onto a plane surface of a device for creating a three-dimensional part in a layer-by-layer fashion, the apparatus comprising:

a covering means extending across said surface in a first direction of said surface, which covering means can be moved back and forth in a second direction perpendicular to said first direction between a first lateral end position and a second lateral end position and which can be filled with powder from above in at least one of the said positions, wherein said covering means comprises a cavity having a width extending across said surface, the cavity being open at its top and its bottom; and a store container;

wherein said store container delivers to said covering means material to be used for the covering when the covering means is in said one lateral end position, said cavity thus being filled to a predetermined level across its entire width; and wherein, at each location across its entire width, the volume of said store container is equal to or greater than the volume of the adjacent cavity.

2. The apparatus according to claim 1, wherein said store container is provided above said covering means.

3. The apparatus according to claim 2, further comprising a sliding shutter or a flap, which is provided at the bottom side of the store container, which is closed in a first position and which can be opened by engagement with the covering means when said covering means is moved underneath said store container.

4. The apparatus according to claim 2, further comprising a scraper at the bottom side of said store container for scraping off material extending beyond said predetermined level.

5. The apparatus according to claim 1, wherein said store container further comprises a pivoting shutter at a bottom side, said pivoting shutter being structured and arranged to open when said covering means is in a filling position.

6. The apparatus according to any one of claims 1 to 5, wherein said cavity is structured and arranged as a slit.

7. The apparatus according to claim 6, wherein said covering means further comprises a smoothening element at an end opposing said surface.

8. The apparatus according to claim 6, further comprising a conveyor positioned underneath said store container, said conveyor being arranged such that a filling position of said covering means is at a location underneath one of the ends of said conveyor.

9. The apparatus according to claim 8, wherein said conveyor is movable during an adjustable period in order to achieve a predetermined filling level.

10. The apparatus according to claims 9, further comprising a sensor for determining whether the predetermined filling level has been reached.

11. The apparatus according to claim 6, wherein said device for creating a three-dimensional part in a layer-by-layer fashion is a laser sintering machine.

12. A laser sintering machine comprising an apparatus for supplying powder onto a plane surface, said apparatus comprising:

a covering means extending across said surface in a first direction of said surface, which covering means can be moved back and forth in a second direction perpendicular to said first direction between a first lateral end position and a second lateral end position and which can be filled with powder from above in at least one of the said positions, wherein said covering means comprises a cavity having a width extending across said surface, the cavity being open at its top and its bottom; and a store container;

wherein said store container delivers to said covering means material to be used for the covering when the covering means is in said one lateral end position, said cavity thus being filled to a predetermined level across its entire width; and wherein, at each location across its entire width, the volume of said store container is equal to or greater than the volume of the adjacent cavity.

13. The laser sintering machine according to claim 12, wherein said store container is provided above said covering means; the apparatus further comprising:

a sliding shutter or a flap, which is provided at the bottom side of the store container, which is closed in a first position and which can be opened by engagement with the covering means when said covering means is moved underneath said store container; and a scraper at the bottom side of said store container for scraping off material extending beyond said predetermined level.

14. The laser sintering machine according to claim 12, wherein said store container further comprises a pivoting shutter at a bottom side, said pivoting shutter being structured and arranged to open when said covering means is in a filling position.

15. The laser sintering machine according to claim 12, wherein the apparatus further comprises a conveyor positioned underneath said store container, said conveyor being arranged such that a filling position of said covering means is at a location underneath one of the ends of said conveyor.

16. The laser sintering machine according to claim 15, wherein said conveyor is movable during an adjustable period in order to achieve a predetermined filling level.

17. The laser sintering machine according to claim 16, further comprising a sensor for determining whether the predetermined filling level has been reached.

* * * * *

UNITED STATES PATENT AND TRADEMARK OFFICE
CERTIFICATE OF CORRECTION

PATENT NO. : 6,672,343 B1  Page 1 of 1
DATED : January 6, 2004
INVENTOR(S) : Perret et al.

It is certified that error appears in the above-identified patent and that said Letters Patent is hereby corrected as shown below:

<u>Title page,</u>
Item [73], Assignee, change "EOS GmbH Optical Systems" to -- EOS GmbH Electro Optical Systems --.

Signed and Sealed this

Eighth Day of June, 2004

JON W. DUDAS
*Acting Director of the United States Patent and Trademark Office*